(12) United States Patent
Sumiyoshi et al.

(10) Patent No.: US 10,810,749 B2
(45) Date of Patent: Oct. 20, 2020

(54) IMAGE PROCESSING APPARATUS, MOVING BODY DEVICE CONTROL SYSTEM, COMPUTER-READABLE MEDIUM, AND IMAGE PROCESSING METHOD

(71) Applicant: Ricoh Company, Ltd., Tokyo (JP)

(72) Inventors: Shinichi Sumiyoshi, Kanagawa (JP); Naoki Motohashi, Kanagawa (JP); Toshifumi Yamaai, Kanagawa (JP); Sadao Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 150 days.

(21) Appl. No.: 16/113,242

(22) Filed: Aug. 27, 2018

(65) Prior Publication Data

US 2018/0365846 A1     Dec. 20, 2018

Related U.S. Application Data

(63) Continuation of application No. PCT/JP2016/086818, filed on Dec. 9, 2016.

(30) Foreign Application Priority Data

Mar. 18, 2016  (JP) .................................. 2016-055575

(51) Int. Cl.
   *G06K 9/00*  (2006.01)
   *G06T 7/50*  (2017.01)
   (Continued)

(52) U.S. Cl.
   CPC ............ *G06T 7/50* (2017.01); *G06K 9/00798* (2013.01); *G06K 9/03* (2013.01); *G06T 7/11* (2017.01);
   (Continued)

(58) Field of Classification Search
   None
   See application file for complete search history.

(56) References Cited

U.S. PATENT DOCUMENTS

| | | |
|---|---|---|
| 2007/0076984 A1 | 4/2007 | Takahashi et al. |
| 2007/0195070 A1 | 8/2007 | Takahashi et al. |
| | (Continued) | |

FOREIGN PATENT DOCUMENTS

| | | |
|---|---|---|
| JP | 2010-109452 | 5/2010 |
| JP | 2012-168838 | 9/2012 |
| | (Continued) | |

OTHER PUBLICATIONS

International Search Report dated Feb. 28, 2017 in PCT/JP2016/086818 filed Dec. 9, 2016 (with English Translation).

(Continued)

*Primary Examiner* — Sean M Conner
(74) *Attorney, Agent, or Firm* — Xsensus LLP

(57) ABSTRACT

An image processing apparatus includes: a distance histogram information generating means configured to generate distance histogram information representing a frequency distribution of distance values in each of a plurality of row regions obtained by division of a captured image in an up-down direction; and a movement surface information processing means configured to: extract a group of distance values matching a feature represented by distance values of the movement surface for each of a plurality of segments obtained by segmentation of the distance histogram information according to the distance values; execute, for a segment where a group of distance values extracted does not satisfy a predetermined error condition, processing of generating information on the movement surface using the group of distance values; and execute, for a segment where a group of distance values extracted satisfies the predeter- (Continued)

mined error condition, predetermined error processing without using the group of distance values.

11 Claims, 10 Drawing Sheets

(51) Int. Cl.
| | |
|---|---|
| *G06T 7/593* | (2017.01) |
| *G08G 1/16* | (2006.01) |
| *G06T 7/11* | (2017.01) |
| *G06T 7/223* | (2017.01) |
| *G06K 9/03* | (2006.01) |
| *B60R 1/00* | (2006.01) |

(52) U.S. Cl.
CPC .............. *G06T 7/223* (2017.01); *G06T 7/593* (2017.01); *G08G 1/161* (2013.01); *B60R 1/00* (2013.01); *B60R 2300/20* (2013.01); *B60R 2300/304* (2013.01); *G06T 2207/10021* (2013.01); *G06T 2207/10024* (2013.01); *G06T 2207/20072* (2013.01); *G06T 2207/30256* (2013.01); *G06T 2207/30261* (2013.01)

(56) References Cited

U.S. PATENT DOCUMENTS

| | | |
|---|---|---|
| 2007/0195370 A1 | 8/2007 | Suga et al. |
| 2012/0207348 A1 | 8/2012 | Saito |
| 2013/0057707 A1 | 3/2013 | Hasegawa et al. |
| 2013/0163821 A1* | 6/2013 | You .................... G06K 9/00208 382/104 |
| 2015/0227800 A1* | 8/2015 | Takemae .................... B60R 1/00 382/104 |
| 2015/0294160 A1 | 10/2015 | Takahashi et al. |
| 2015/0302560 A1 | 10/2015 | Sumiyoshi |
| 2016/0014406 A1 | 1/2016 | Takahashi et al. |
| 2016/0019429 A1 | 1/2016 | Ishigaki et al. |
| 2017/0262734 A1 | 9/2017 | Nakata et al. |

FOREIGN PATENT DOCUMENTS

| | | |
|---|---|---|
| JP | 2013-030183 | 2/2013 |
| JP | 2014-225220 | 12/2014 |
| JP | 2016-029557 | 3/2016 |
| JP | 2017-162116 | 9/2017 |

OTHER PUBLICATIONS

Written Opinion dated Feb. 28, 2017 in PCT/JP2016/086818 filed Dec. 9, 2016.
Extended European Search Report dated Feb. 22, 2019 in corresponding European Patent Application No. 16894581.4, 11 pages.
Ki-Yong Lee et al., "Estimation of Longitudinal Profile of Road Surface from Stereo Disparity Using Dijkstra Algorithm", International Journal of Control, Automation and Systems, vol. 12, No. 4, XP055555366, Jul. 1, 2014, pp. 895-903.
R. Labayrade et al., "Real Time Obstacle Detection in Stereovision on Non Flat Road Geometry through "V-disparity" Representation", Intelligent Vehicle Symposium, 2002. IEEE Jun. 17-21, 2002, vol. 2, XP055555343, Jun. 21, 2002, pp. 646-651.
A. Wedel et al., "B-Spline Modeling of Road Surfaces with an Application to Free-Space Estimation", IEEE Transactions on Intelligent Transportation Systems, vol. 10, No. 4, XP055555368, Dec. 4, 2009, pp. 572-583.
A.D. Sappa et al., "An Efficient Approach to Onboard Stereo Vision System Pose Estimation", IEEE Transactions on Intelligent Transportation Systems, vol. 9, No. 3, XP055555385, Sep. 30, 2008, pp. 476-490.
Jae Kyu Suhr et al., "Noise-resilient Road Surface and Free Space Estimation Using Dense Stereo", 2013 IEEE Intelligent Vehicles Symposium (IV), XP055555393, Jun. 1, 2013, pp. 461-466.
Jae Kyu Suhr et al., "Dense Stereo-Based Robust Vertical Road Profile Estimation Using Hough Transform and Dynamic Programming", IEEE Transactions on Intelligent Transportation Systems, vol. 16, No. 3, XP055555394, Jun. 1, 2015, pp. 1528-1536.

* cited by examiner

DISPARITY IMAGE

V-MAP

IMAGE PROCESSING APPARATUS, MOVING BODY DEVICE CONTROL SYSTEM, COMPUTER-READABLE MEDIUM, AND IMAGE PROCESSING METHOD

CROSS-REFERENCE TO RELATED APPLICATIONS

The present application is a continuation application of International Application No. PCT/JP2016/086818, filed Dec. 9, 2016, which claims priority to Japanese Patent Application No. 2016-055575, filed Mar. 18, 2016. The contents of these applications are incorporated herein by reference in their entirety.

BACKGROUND OF THE INVENTION

1. Field of the Invention

The present invention relates to an image processing apparatus, a moving body device control system, a computer-readable medium, and an image processing method.

2. Description of the Related Art

Conventionally, image processing apparatuses, which generate distance image information by imaging front regions (imaging regions) of automobiles moving on road surfaces by use of stereo cameras and obtains road surface information based on the distance image information, have been known.

For example, disclosed in Japanese Unexamined Patent Application Publication No. 2014-225220 is an image processing apparatus that generates disparity histogram information (V-map information) representing a frequency distribution of disparity values in each of plural row regions obtained by division of a captured image in an up-down direction from disparity image information for a front region of a moving body, such as an automobile, and obtains information on a movement surface, such as a road surface, by use of the disparity histogram information. This image processing apparatus executes collinear approximation processing of: extracting, based on the disparity histogram information, movement surface candidate points that are pixels (pixels on the V-map) matching a feature of the movement surface, such as availability of the maximum frequency for each disparity value, and performing collinear approximation of the extracted movement surface candidate points. Upon the execution, the disparity histogram information is segmented into three segments according to the disparity values, and the linear approximation processing is executed for each segment in descending order of the disparity values of these segments (from the segment close to the moving body in actual distance).

When the number of movement surface candidate points extracted in a segment is equal to or less than a predetermined value, by enlarging a disparity value range of that segment until the number of movement surface candidate points exceeds the predetermined value, the image processing apparatus disclosed in Japanese Unexamined Patent Application Publication No. 2014-225220 obtains, an appropriate approximate straight line corresponding to the movement surface. Further, when the gradient and the intercept of an approximate straight line obtained for a segment are not in predetermined ranges also, by enlargement of a disparity value range of that segment until the gradient and the intercept of the approximate straight line enter the predetermined ranges, an appropriate approximate straight line corresponding to the movement surface is obtained.

Further, the image processing apparatus disclosed in Japanese Unexamined Patent Application Publication No. 2014-225220 executes correction processing of making a starting end of an approximate straight line of a segment coincide with a terminal end of an approximate straight line of an adjacent segment at a side larger in disparity value than that segment such that the obtained approximate straight lines of these segments are continuous with each other at a boundary portion therebetween. Or, the image processing apparatus executes correction processing of correcting approximate straight lines of two segments adjacent to each other, such that these approximate straight lines pass the middle point between end points of the approximate straight lines of these segments.

Generally, movement surface information, such as distances to points from a movement surface where a moving body moves and heights of these points, is very beneficial information in later processing (such as object detection processing for detection of an object present in a movement direction of the moving body) where the movement surface information is used. However, if inaccurate movement surface information is used as is in later processing, a problem that appropriate processing is unable to be executed in the later processing is caused. When an error condition is satisfied, like when the number of movement surface candidate points extracted is equal to or less than the predetermined value, or the gradient and the intercept of the approximate straight line obtained are not in the predetermined ranges, the image processing apparatus described in Japanese Unexamined Patent Application Publication No. 2014-225220 enlarges the disparity value range of that segment or executes correction processing of the approximate straight line. However, since the image processing apparatus described in Japanese Unexamined Patent Application Publication No. 2014-225220 continues to use the movement surface candidate points extracted in that segment even if the error condition is satisfied, under a specific condition, like when there are many errors in the extracted movement surface candidate points, an appropriate approximate straight line corresponding to the movement surface may be unable to be obtained, and inaccurate movement surface information may be used in later processing.

This problem is caused similarly, not only when movement surface information is obtained based on disparity image information generated from plural captured images acquired by plural imaging means, but widely also when movement surface information is obtained based on distance image information of a region in front of a moving body in a movement direction thereof.

SUMMARY OF THE INVENTION

According to one aspect of the present invention, an image processing apparatus is configured to execute image processing of obtaining, based on distance image information in front of a moving body in a movement direction, information on a movement surface in front of the moving body in the movement direction. The image processing apparatus includes a distance histogram information generating means, and a movement surface information processing means. The distance histogram information generating means is configured to generate, based on the distance image information, distance histogram information representing a frequency distribution of distance values in each of a plurality of row regions obtained by division of a captured image in an up-down direction. A movement surface information processing means is configured to: extract a group of distance values matching a feature represented by distance values of the movement surface, from distance values having frequencies exceeding a predetermined frequency threshold, for each of a plurality of segments obtained by segmentation of the distance histogram information according to the distance values; execute, for a segment where a group of distance values extracted does not satisfy a predetermined error condition, processing of generating information on the movement surface using the group of distance values; and execute, for a segment where a group of distance values extracted satisfies the predetermined error condition, predetermined error processing without using the group of distance values.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
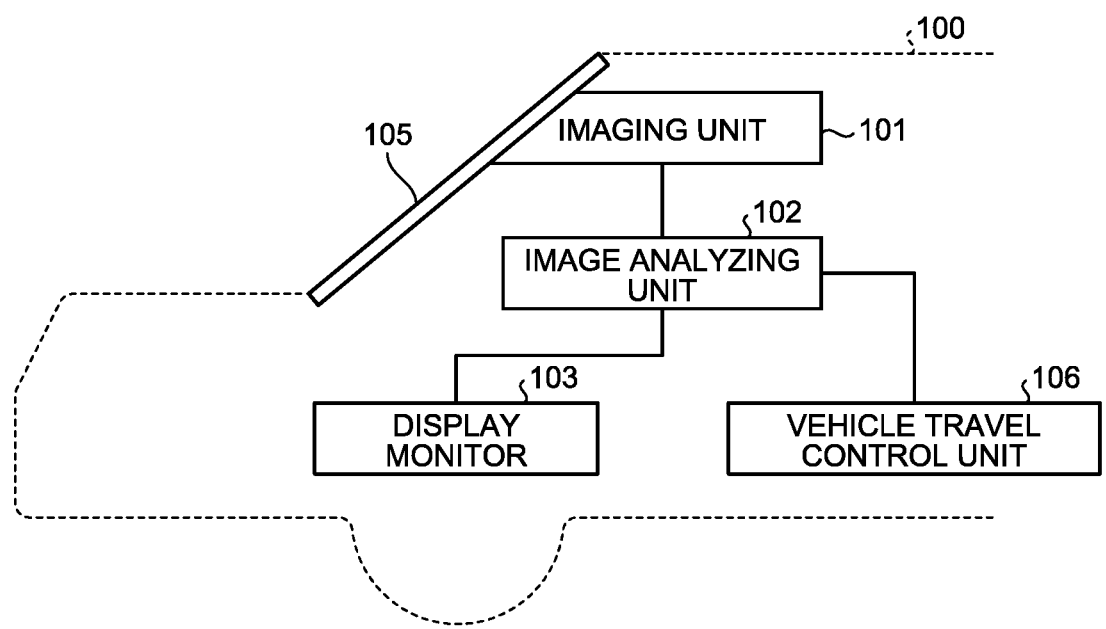
FIG. 1 is a schematic diagram illustrating a schematic configuration of an on-vehicle device control system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, an embodiment, in which an image processing apparatus according to the present invention has been applied to an object detection apparatus in an on-vehicle device control system that is a moving body device control system, will be described.

FIG. 1 is a schematic diagram illustrating a schematic configuration of the on-vehicle device control system according to this embodiment. In this on-vehicle device control system: a detection target is detected from captured image data captured by an imaging unit 101 installed in an own vehicle 100, such as an automobile, which is a moving body, the captured image data being of a region in front of the own vehicle in a travelling direction thereof (an imaging region); and control of various on-vehicle devices is executed by use of results of this detection.

Provided in the on-vehicle device control system according to this embodiment is the imaging unit 101, which performs imaging of the region in front of the own vehicle 100 in the traveling direction thereof. This imaging unit 101 is installed, for example, near a room mirror of a windshield 105 of the own vehicle 100. Various data, such as the captured image data acquired through the imaging by the imaging unit 101, are input to an image analyzing unit 102. By analyzing the data transmitted from the imaging unit 101, the image analyzing unit 102 detects a detection target, such as another vehicle, which is present in the imaging region.

Detection results of the image analyzing unit 102 are transmitted to a vehicle travel control unit 106. Based on a detection result detected by the image analyzing unit 102, the vehicle travel control unit 106 executes driving assistance control, such as notification to a driver of the own vehicle 100 of a warning by use of a display monitor 103, or control of the steering wheel or the brake of the own vehicle 100.

Figure 2:
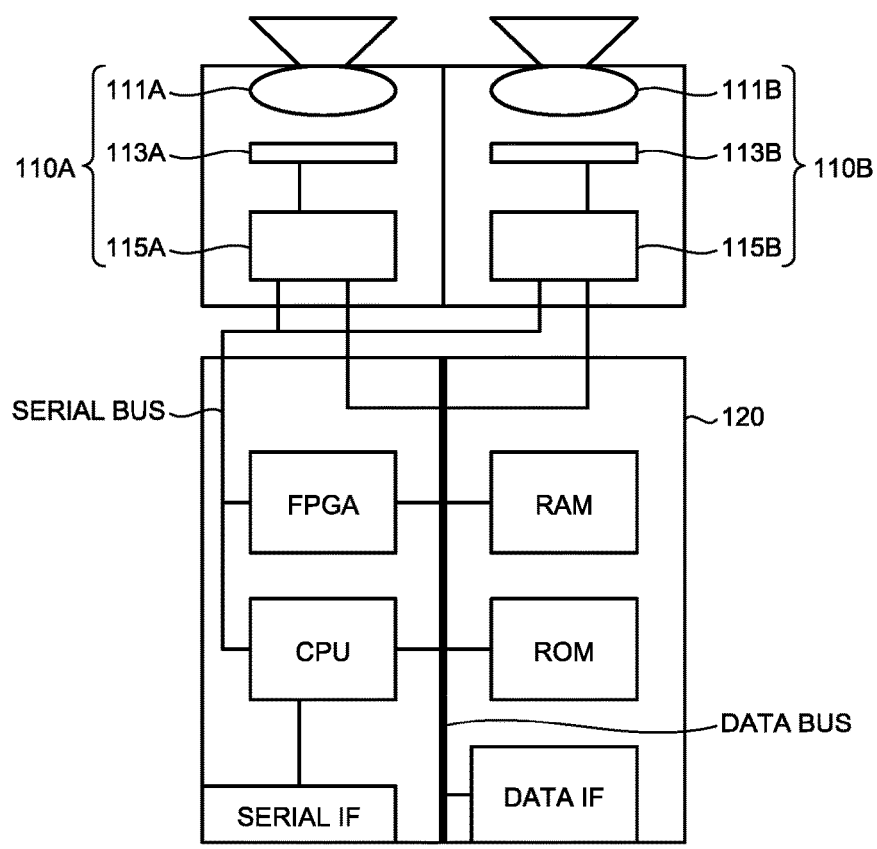
FIG. 2 is a schematic diagram illustrating a schematic configuration of an imaging unit forming the on-vehicle device control system.

FIG. 2 is a schematic diagram illustrating a schematic configuration of the imaging unit 101. The imaging unit 101 includes a stereo camera having two imaging sections 110A and 110B serving as imaging means, and the two imaging sections 110A and 110B are the same. The imaging sections 110A and 110B are respectively formed of: imaging lenses 111A and 111B; image sensors 113A and 113B each having light receiving elements arranged two-dimensionally thereon; and image sensor controllers 115A and 115B. The image sensor controllers 115A and 115B play roles of exposure control of the image sensors 113A and 113B, image reading control, communication with external circuits, transmission of image data, and the like. Output from the image sensor controllers 115A and 115B are captured image data (luminance image data) resulting from conversion of analog electric signals output from the image sensors 113A and 113B (amounts of light received by the light receiving elements on the image sensors) into digital electric signals.

Further, the imaging unit 101 includes an image processing board 120 that is connected to the two imaging sections 110A and 110B via a data bus and a serial bus. Provided on the image processing board 120 are a central processing unit (CPU), a RAM, a ROM, a field-programmable gate array (FPGA), a serial interface (IF), a data IF, and the like. The data bus of the image processing board 120 transfers the luminance image data output from the two imaging sections 110A and 110B, to the RAM on the image processing board 120. The serial bus of the image processing board 120 transmits and receives commands for change of sensor exposure control values, commands for change of image reading parameters, various setting data, and the like, to and from the CPU and the FPGA. The FPGA on the image processing board 120 generates disparity image data by executing processing requiring real-timeness, on image data stored in the RAM, and rewrites the generated disparity image data into the RAM, the processing being, for example, gamma correction, skew correction (parallelization of left and right images), and disparity calculation through block matching. The CPU loads a program for execution of road surface shape detection processing, object detection processing, or the like from the ROM, and executes various kinds of processing by inputting the luminance image data and disparity image data accumulated in the RAM. The detected various data are output outside from the data IF or the serial IF. Upon the execution of the various kinds of processing, information on the vehicle (such as the vehicle speed, acceleration, rudder angle, and yaw rate) is input, as appropriate, by use of the data IF, and the information is used as parameters in the various kinds of processing.

Figure 3:
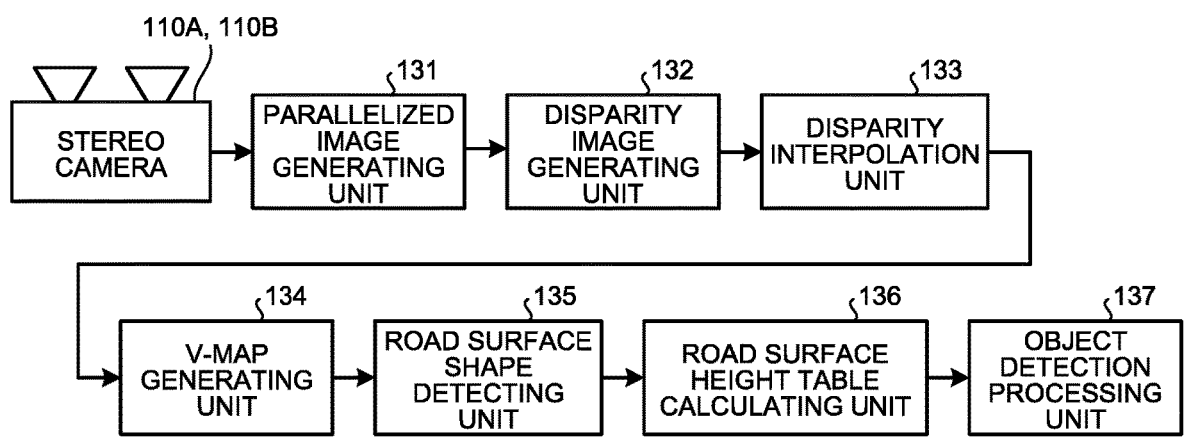
FIG. 3 is a processing block diagram for explanation of object detection processing implemented by an image processing board and an image analyzing unit in FIG. 2.

Next, object detection processing according to this embodiment will be described. FIG. 3 is a processing block diagram for explanation of, mainly, object detection processing implemented: by the CPU on the image processing board 120 executing a program; or by the FPGA. Luminance image data are output from the two imaging sections 110A and 110B forming the stereo camera. Upon the output, if the imaging sections 110A and 110B are color imaging sections, color luminance conversion for acquisition of a luminance signal (Y) from their RGB signals is executed by use of Equation (1) below, for example.

$$Y=0.3R+0.59G+0.11B \quad (1)$$

When the luminance image data are input, firstly, parallelized image generation processing is executed by a parallelized image generating unit 131. In this parallelized image generation processing, from skews of optical systems in the imaging sections 110A and 110B and a relative positional relation between the left and right imaging sections 110A and 110B, the luminance image data (a reference image and a comparison image) output from the imaging sections 110A and 110B are converted into an ideal parallelized stereo image that is acquired when two pin hole cameras are installed parallelly.

After this parallelized image processing is executed, subsequently, a disparity image generating unit 132 formed of an FPGA or the like executes disparity image generation processing for generation of disparity image data (distance image information). In disparity image generation processing, firstly, by use of reference image data and comparison image data, disparity between these sets of data is calculated, and thereby disparity image data are generated and output, the reference image data being luminance image data of the imaging section 110A, which is one of the two imaging sections 110A and 110B, the comparison image data being luminance image data of the imaging section 110B, which is the other one of the two imaging sections 110A and 110B. The disparity image data represent a disparity image representing pixel values of image portions, the pixel values being pixel values according to disparity values (distance values) d calculated for the image portions on the reference image data.

Specifically, the disparity image generating unit 132 defines, for a row of the reference image data, a block formed of plural pixels (for example, 16 pixels×1 pixel) around one pixel of interest. Further, for the same row in the comparison image data, a block having the same size as the defined block of the reference image data is shifted pixel by pixel in a horizontal line direction (x-direction), and correlation values indicating correlation between feature amounts representing features of pixel values of the defined block in the reference image data and feature amounts representing features of pixel values of each block in the comparison image data are respectively calculated. Based on the calculated correlation values, matching processing, in which a block of the comparison image data is selected, is executed, the block being one of the blocks in the comparison image data and having the highest correlation with the block of the reference image data. Thereafter, the amount of positional displacement between the pixel of interest of the block of the reference image data and a corresponding pixel of the block of the comparison image data selected in the matching processing is calculated as a disparity value d. By execution of this processing for calculation of the disparity value d on the whole region or a specific region of the reference image data, disparity image data are able to be obtained.

As feature amounts of a block used in the matching processing, for example, values of pixels (luminance values) in the block may be used, and as a correlation value, for example, the sum of absolute values of differences between values (luminance values) of pixels in a block of the reference image data and values (luminance values) of pixels in a block of the comparison image data respectively corresponding to those pixels may be used. In this case, a block having the smallest sum can be said to have the highest correlation.

If the matching processing by the disparity image generating unit 132 is implemented by hardware processing, for example, any of methods including the sum of squared differences (SSD), the zero-mean sum of squared differences (ZSSD), the sum of absolute differences (SAD), and the zero-mean sum of absolute differences (ZSAD) may be used. Since only disparity values in pixel units are able to be calculated in the matching processing, if a disparity value at a sub pixel level of less than one pixel is needed, an estimated value needs to be used. As a method for this estimation, for example, the equiangular straight line method or the quadratic curve method may be used. However, since error is generated in this sub-pixel level estimated disparity value, estimation error correction (EEC) or the like for reduction of this estimation error may be used.

A disparity interpolation unit 133 executes disparity interpolation processing of interpolating a disparity value of an image portion, for which a disparity value has been unable to be calculated by the above described disparity image generation processing in the disparity image generating unit 132. For example, at a horizontal direction edge portion or a spot small in change of luminance in the luminance image data, calculation for block matching in the disparity image generation processing is unable to be executed correctly, and disparity values thereof may be unable to be calculated. In that case, in the disparity interpolation processing, for an image portion satisfying a predetermined interpolation condition, processing of filling in interpolated disparity between two separate pixels is executed. This interpolation condition may be, for example, a condition that a distance between two points at the same horizontal direction coordinate is less than a predetermined size (width) and another disparity value is not present between these two points.

When the disparity interpolation processing has been executed as described above, subsequently, a V-map generating unit 134 executes V-map generation processing of generating a V-map. Where each set of disparity pixel data included in the disparity image data is represented by a combination (x, y, d) of an x-direction position, a y-direction position, and a disparity value d, three-dimensional coordinate information (d, y, f) that has been converted from this combination and has the disparity value d set along an X-axis, y along a Y-axis, and a frequency f along a Z-axis, or three-dimensional coordinate information (d, y, f) that is from this three-dimensional coordinate information (d, y, f) and is limited to information exceeding a predetermined frequency threshold, is generated. This three-dimensional coordinate information (d, y, f) that has been distributed in an X-Y two-dimensional coordinate system is called a V-map.

Figure 4A:
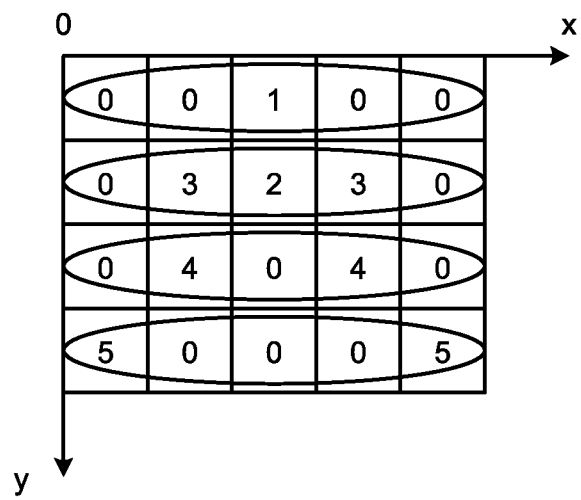
FIG. 4A is an explanatory diagram illustrating an example of a disparity value distribution of a disparity image.
Figure 4B:
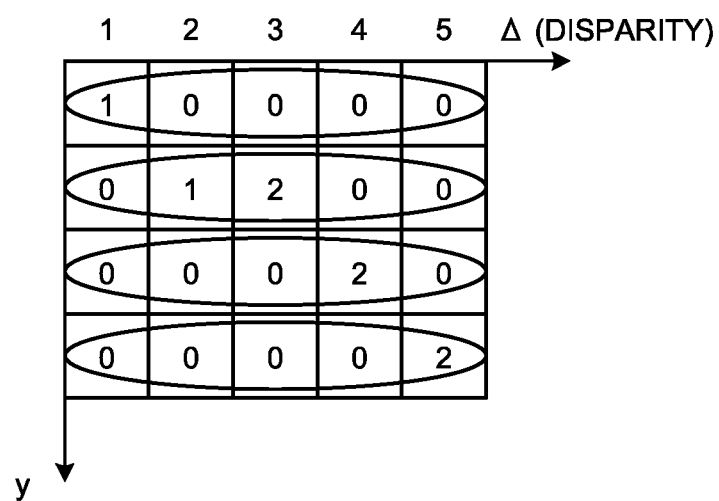
FIG. 4B is an explanatory diagram illustrating a disparity distribution map (a V-map) representing a disparity value frequency distribution for each row of the disparity image in FIG. 4A.

Specifically, the V-map generating unit 134 calculates a disparity value frequency distribution, for each of plural row regions of the disparity image data obtained by division of the image in an up-down direction thereof. In a specific example, when disparity image data having a disparity value distribution as illustrated in FIG. 4A are input, the V-map generating unit 134 calculates and outputs a disparity value frequency distribution that is a distribution of counts of data of disparity values for each row. By representation of information on the disparity value frequency distribution of each row obtained as described above on a two-dimensional orthogonal coordinate system having the y-direction positions on the disparity image (the up-down direction positions on the captured image) taken along the Y-axis and the disparity values taken along the X-axis, a V-map as illustrated in FIG. 4B is able to be obtained. This V-map may be represented as an image having pixels distributed on the two-dimensional orthogonal coordinate system, each of the pixels having a pixel value according to the frequency f.

Figure 5:
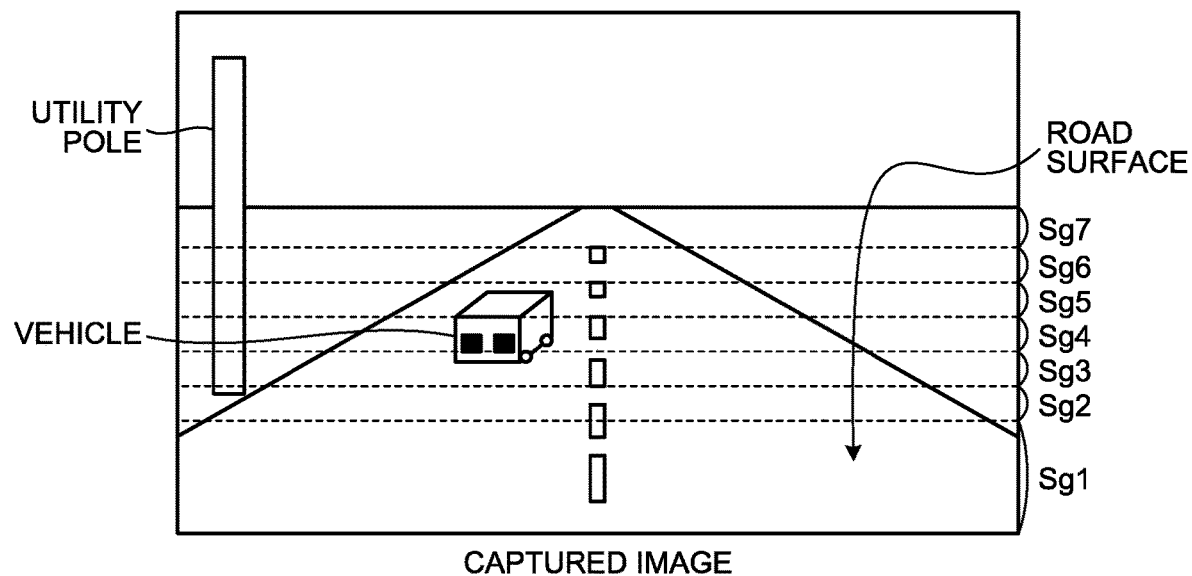
FIG. 5 is an image example schematically illustrating an example of a reference image captured by one of imaging sections.
Figure 6:
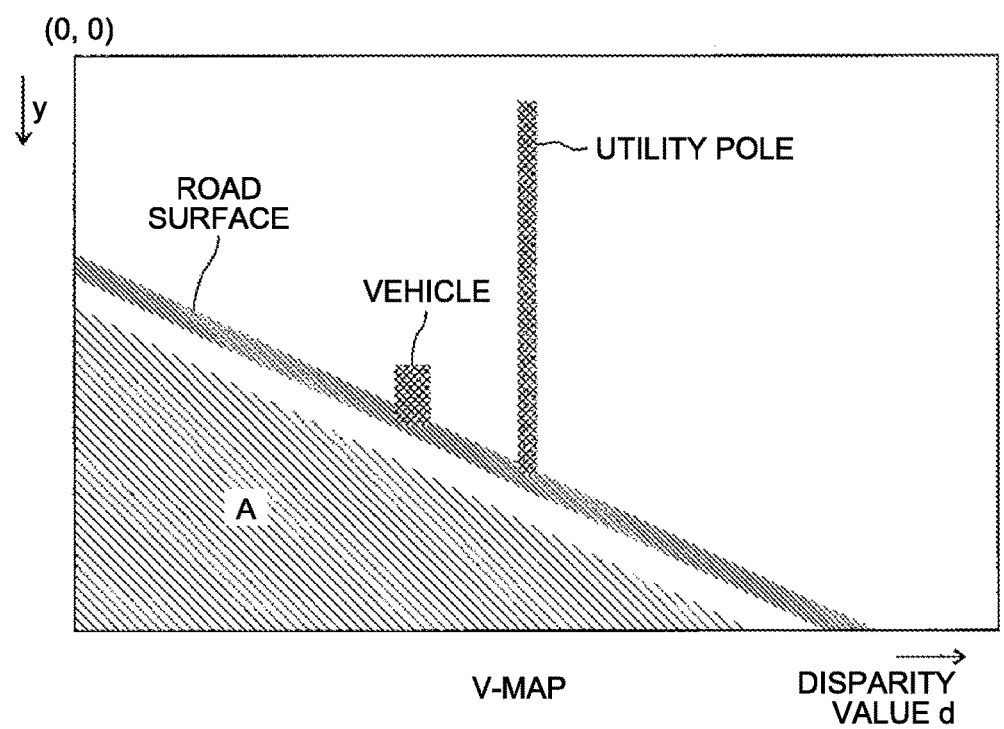
FIG. 6 is an explanatory diagram illustrating a V-map corresponding to the image example in FIG. 5.

Subsequently, in this embodiment, from information on the V-map (disparity histogram information) generated by the V-map generating unit 134, a road surface shape detecting unit 135 executes road surface shape detection processing for detection of a three-dimensional shape of a road surface in front of the own vehicle 100. FIG. 5 is an image example schematically illustrating an example of a reference image captured by the imaging section 110A. FIG. 6 is a V-map corresponding to the image example in FIG. 5. In the image example illustrated in FIG. 5, a road surface where the own vehicle 100 is traveling, a preceding vehicle present in front of the own vehicle 100, and a utility pole present outside the road have been captured. This image example corresponds to a case where the road surface in front of the own vehicle 100 is a relatively flat road surface, that is, the road surface in front of the own vehicle 100 coincides with a virtual reference road surface (a virtual reference movement surface) obtained by extension of a surface parallel to a road surface portion directly below the own vehicle 100 to the front of the own vehicle. In this case, as illustrated in FIG. 6, at a lower portion of the V-map corresponding to a lower portion of the image, high frequency points are distributed in an approximately linear shape having a gradient such that the disparity value d decreases upward in the image. Pixels having such a distribution can be said to be pixels that are present at substantially the same distance in each row on the disparity image, that are the highest in occupancy rate, and that depict a detection target that continuously becomes distant upward in the image. In a region that is below these points distributed in the approximately linear shape and that is illustrated with "A" in FIG. 6, distribution of points due to noise may practically occur therein, but basically there is no distribution of points therein. When the above described feature is utilized, estimation of pixels depicting a road surface is made possible.

Since a region in front of the own vehicle is captured by the imaging section 110A, contents of an image captured thereby are, as illustrated in FIG. 5, such that the disparity value d of the road surface decreases upward in the image. Further, in the same row (horizontal line), pixels depicting the road surface have substantially the same disparity value d. Therefore, the above described high frequency points distributed in the approximately linear shape on the V-map correspond to a feature that the pixels depicting the road surface (movement surface) have. Therefore, pixels distributed on or near an approximate straight line obtained by collinear approximation of the high frequency points on the V-map are able to be estimated as pixels depicting a road surface, highly accurately. Further, a distance to a road surface portion depicted by each pixel is able to be found from the disparity value d of a corresponding point on the approximate straight line, highly accurately.

When collinear approximation of the high frequency points on the V-map is executed, in what range points included in the collinear approximation processing are to be included largely affects accuracy of the processing result. That is, the larger the range to be included in collinear approximation processing is, the more points not corresponding to a road surface are included and the lower the processing accuracy becomes, and further, the narrower the range to be included in collinear approximation processing is, the less the number of points corresponding to a road surface becomes, and the lower the processing accuracy becomes, too. Therefore, in this embodiment, disparity histogram information (distance histogram information) to be subjected to collinear approximation processing is extracted as described below.

Figure 7:
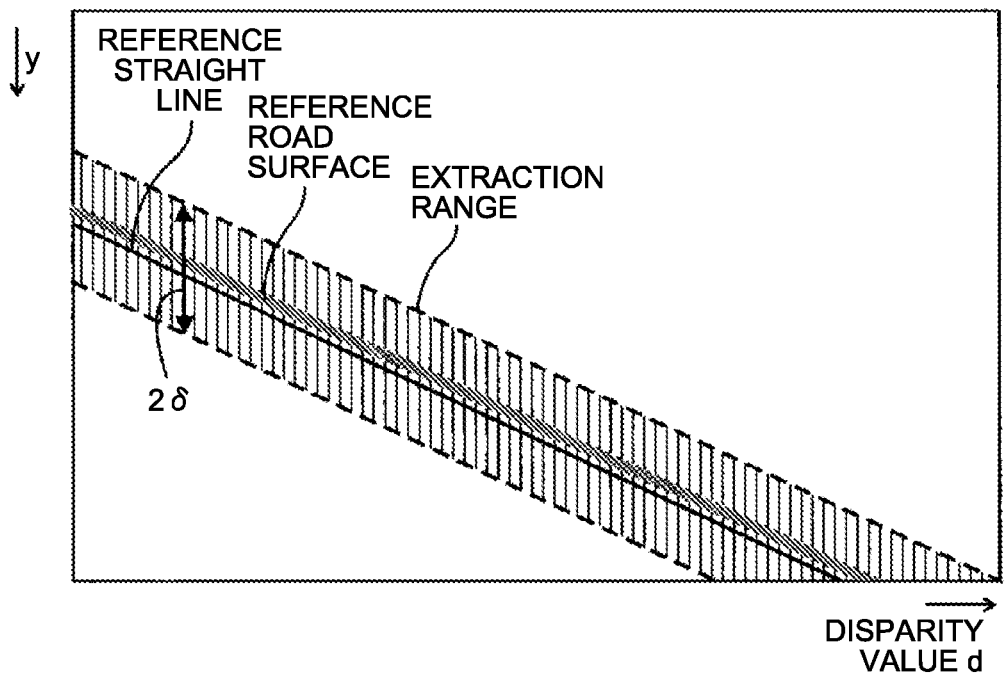
FIG. 7 is an explanatory diagram illustrating a V-map for explanation of an extraction condition according to this embodiment.

FIG. 7 is an explanatory diagram illustrating a V-map for explanation of an extraction condition according to this embodiment. When the V-map generating unit 134 according to the embodiment receives disparity image data, the V-map generating unit 134 generates V-map information serving as distance histogram information by converting each set of disparity pixel data (x, y, d) included in the disparity image data into a V-map element (d, y, f) serving as a disparity histogram information component that is three-dimensional coordinate information. Upon this generation, from the disparity image data, disparity pixel data having a relation between the image's up-down direction position y and the disparity value d are extracted, the relation satisfying a predetermined extraction condition, and the V-map information is generated by execution of the above described conversion on the extracted disparity pixel data.

The extraction condition according to this embodiment is a condition that a road surface in front of the own vehicle 100 belongs to a predetermined extraction range determined based on a relation between a disparity value d and the image's up-down direction position y, the relation corresponding to a virtual reference road surface (a virtual reference movement surface) obtained by extension of a surface parallel to a road surface portion directly below the own vehicle 100 to the front of the own vehicle. This relation between the disparity value d and the image's up-down direction position y corresponding to the reference road surface is represented, as illustrated in FIG. 7, by a straight line (hereinafter, referred to as "reference straight line") on a V-map. In this embodiment, a range of ±δ in the image's up-down direction having this straight line at the center is prescribed as the extraction range. This extraction range is set so as to include a variation range of the V-map element (d, y, f) of the actual road surface that changes every moment depending on the situation.

Specifically, for example, when a road surface in front of the own vehicle is relatively sloped upward, a road surface image portion captured in a captured image (a movement surface image region) widens upward in the image more than when the road surface is relatively flat. What is more, when their road surface image portions captured at the same up-down direction position in their images are compared with each other, in the case where the road surface is sloped relatively upward, the disparity value d is higher than that in the case where the road surface is relatively flat. The V-map element (d, y, f) in this case is positioned above the reference straight line and represents a straight line having a larger gradient (the absolute value) than the reference straight line, on the V-map, roughly. In this embodiment, if a relatively upward slope of a front road surface is in a presumable range, a V-map element (d, y, f) of that road surface fits in the extraction range.

Further, for example, if a road surface in front of the own vehicle is relatively sloped downward, the V-map element (d, y, f) thereof is positioned below the reference straight line and represents a straight line having a smaller gradient (the absolute value) than the reference straight line, on the V-map. In this embodiment, if a relatively downward slope of a front road surface is in a presumable range, a V-map element (d, y, f) of that road surface fits in the extraction range.

Further, for example, upon acceleration when the own vehicle 100 is accelerating the velocity, load is applied to the back of the own vehicle 100 and the posture of the own vehicle 100 becomes a posture where the front of the own vehicle faces upward in a vertical direction. In this case, as compared to a case where the velocity of the own vehicle 100 is constant, a road surface image portion (a movement surface image region) captured in the captured image shifts downward in the image. A V-map element (d, y, f) in this case is roughly a V-map element that is positioned below the reference straight line and that represents a straight line substantially parallel to the reference straight line, on the V-map. In this embodiment, if the acceleration of the own vehicle 100 is in a presumable range, a V-map element (d, y, f) of that road surface fits in the extraction range.

Further, for example, upon deceleration when the own vehicle 100 is decelerating the velocity, load is applied to the front of the own vehicle 100 and posture of the own vehicle 100 becomes a posture where the front of the own vehicle faces downward in the vertical direction. In this case, as compared to a case where the velocity of the own vehicle 100 is constant, a road surface image portion (a movement surface image region) captured in the capture image shifts upward in the image. A V-map element (d, y, f) in this case is roughly a V-map element that is positioned above the reference straight line and that represents a straight line substantially parallel to the reference straight line, on the V-map. In this embodiment, if the deceleration of the own vehicle 100 is in a presumable range, a V-map element (d, y, f) of that road surface fits in the extraction range.

When the V-map information has been generated by the V-map generating unit 134, the road surface shape detecting unit 135 executes processing for collinear approximation of high frequency points on the V-map representing a feature represented by pairs of disparity values and y-direction positions (V-map elements) corresponding to the road surface, that is, the feature that the disparity value decreases upward in the capture image. When the road surface is flat, sufficiently accurate approximation is possible with a single straight line, but for a road surface that changes in road surface sloping condition in the traveling direction of the vehicle, sufficiently accurate approximation with a single straight line is difficult. Therefore, in this embodiment, information on a V-map (V-map information) is segmented into two or more disparity value segments according to the disparity values, and collinear approximation is individually executed on each of the disparity value segments.

When the road surface shape detecting unit 135 according to this embodiment receives V-map information (V-map information) output from the V-map generating unit 134, the road surface shape detecting unit 135 firstly detects road surface candidate points that are high frequency points on the V-map representing a feature represented by V-map elements corresponding to a road surface, that is, the feature that the disparity value decreases upward in the capture image.

In this road surface candidate point detection processing according to this embodiment, the information on the V-map (the V-map information) is segmented into two or more disparity value segments according to the disparity values, and road surface candidate points in each of the disparity value segments are determined according to a decision algorithm corresponding to that disparity value segment. Upon this processing, the road surface candidate points may be detected by: rough segmentation of the V-map into two regions in the X-axis direction (the horizontal axis direction), that is, into a region large in the disparity value and a region small in the disparity value, with a disparity value corresponding to a predetermined reference distance being a boundary therebetween; and use of a road surface candidate point detection algorithm different for each of these regions.

Figure 8:
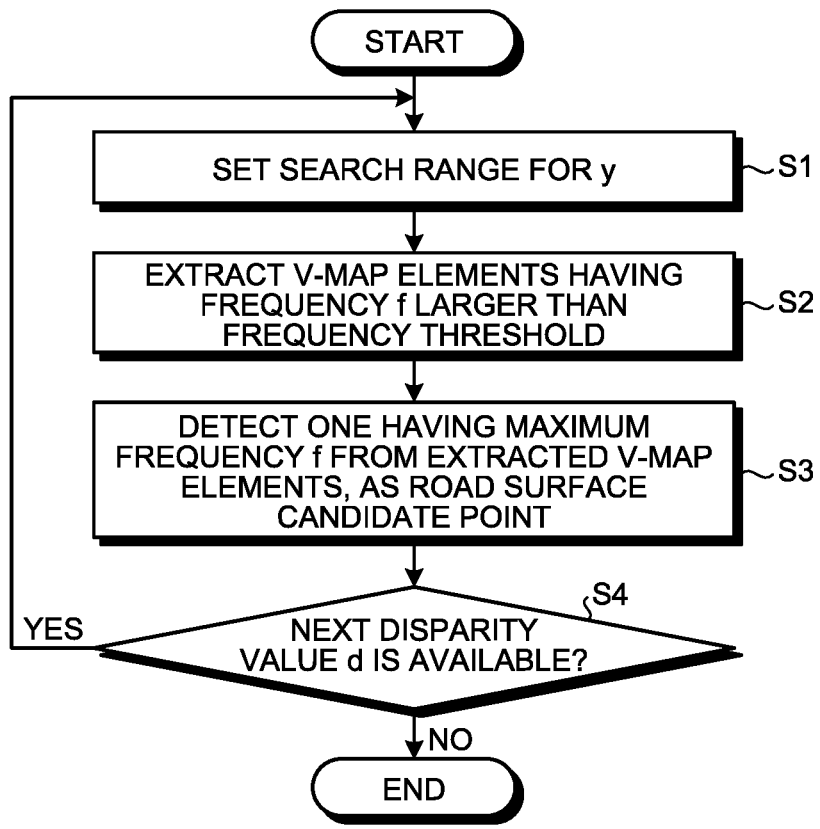
FIG. 8 is a flow chart illustrating a flow of road surface candidate point detection processing according to this embodiment.

FIG. 8 is a flow chart illustrating a flow of the road surface candidate point detection processing according to this embodiment. For input information on a V-map, for example, detection of road surface candidate points is executed in descending order of the disparity value d, and a road surface candidate point (y, d) for each disparity value d is detected. Specifically, a search range of y according to the disparity value d ("yp−δ" to "yp+δ") is set (S1), and any V-map element (d, y, f) having a frequency f larger than a predetermined frequency threshold in this search range is extracted (S2). A V-map element (d, y, f) having the largest frequency f among the extracted V-map elements is then detected as a road surface candidate point of that disparity value d (S3). The above described processing of Steps S1 to S3 is repeatedly executed until there is no more disparity value d (S4). Noise removal processing by use of a morphology filter or the like may be executed, for example, before the road surface candidate point detection processing, or after the processing of Step S2 of the road surface candidate point detection processing.

When the road surface candidate point for each disparity value d has been detected by the road surface candidate point detection processing as described above, subsequently, collinear approximation processing for determination of an approximate straight line on the V-map for these road surface candidate points is executed. Upon this collinear approximation processing, when the road surface is flat, sufficiently accurate approximation is possible with a single straight line over the whole region of the disparity value range of the V-map, but when the sloping condition of the road surface changes in the traveling direction of the vehicle, sufficiently accurate approximation with a single straight line is difficult. Therefore, in this embodiment, information on a V-map (V-map information) is segmented into two or more disparity value segments according to the disparity values, and collinear approximation processing is individually executed for each of these segments.

Figure 9:
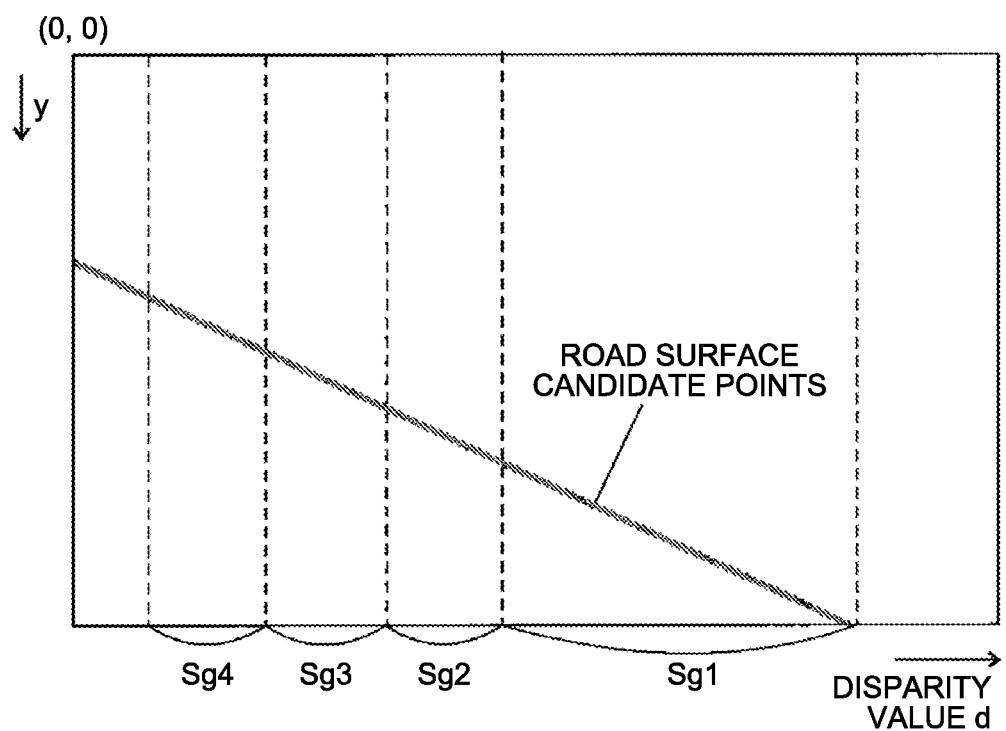
FIG. 9 is an explanatory diagram illustrating an example where a V-map has been segmented into seven segments according to disparity values.

In this embodiment, as illustrated in FIG. 5, an image portion where a road surface is likely to be displayed (a lower portion of the image) is segmented into seven segments Sg1 to Sg7. Segments on the V-map corresponding thereto are as illustrated in FIG. 9. In FIG. 9, only a part of the seven segments (the first segment Sg1 to the fourth segment Sg4) is illustrated. In this embodiment, widths of these segments (disparity value widths) correspond to the one large segment (the first segment Sg1) and the six small segments (the second segment Sg2 to the seventh segment Sg7) obtained by segmentation on the luminance image data illustrated in FIG. 5, but a width of each segment is set as appropriate.

For example, if segments are obtained by equal segmentation based on distance, the more distant a segment is on the V-map, the narrower the width of the segment (the disparity value width) becomes, and the lower the accuracy of collinear approximation becomes. Further, if segments are obtained by equal segmentation based on the disparity values, the width of a segment at a short distance becomes narrow on the V-map. Therefore, for example, a segmentation rule, by which the first segment Sg1 is set to have a width corresponding to a predetermined fixed distance, and from the second segment (the second segment Sg2 to the seventh segment Sg7), each of these segments is set to have a width corresponding to a distance that results from multiplication of a distance corresponding to the width (the disparity value width) of the directly preceding segment by a constant (for example, by "2"), may be adopted. By this segmentation rule, every segment is able to have an appropriate width (a disparity value range). Distance ranges corresponding to these segments will be different according to this segmentation rule, but the numbers of road surface candidate points used in collinear approximation processing for the segments are able to be uniformized among the segments, and appropriate collinear approximation processing is able to be executed for every segment.

Further, in this embodiment, the segments are obtained by segmentation to be continuous without overlapping each other, but segments may be set to overlap each other. For example, a segmentation rule, by which a start point of the second segment Sg2 is made the middle point between a start point and an end point of the first segment Sg1, and a start point of the third segment Sg3 is made the middle point between an end point of the first segment Sg1 and an end point of the second segment Sg2, may be adopted. Further, for example, dynamic change of the width of each segment, such as change of the width of each segment when a front road surface of the own vehicle 100 is detected to be an upward slope, may be performed.

In the collinear approximation processing, least squares approximation may be used, but for more accurate execution, other approximation, such as Reduced Major Axis (RMA), is preferably used. This is because, least squares approximation results in accurate calculation when there is a premise that X-axis data have no error and Y-axis data have error. However, in consideration of characteristics of road surface candidate points detected from V-map information, in data of each V-map element included in the V-map information, the Y-axis data y can be said to represent an accurate position on the image, but the disparity value d that is the X-axis data includes error. Further, in the road surface candidate point detection processing, since search for a road surface candidate point is executed along the Y-axis direction, and a V-map element having the largest y value is detected as the road surface candidate point, the road surface candidate points include error in the Y-axis direction, too. Therefore, the V-map elements serving as the road surface candidate points include error in both the X-axis direction and the Y-axis direction, and the premise for least squares approximation is thus broken. Therefore, a regression line (RMA) compatible with two variables (d and y) is valid.

In the collinear approximation processing executed for each segment, except for the first segment Sg1, an approximate straight line is obtained, such that a terminal end of an approximate straight line obtained for an adjacent segment at a short distance side (a side larger in disparity value) becomes a starting end of that segment. Thereby, discontinuity of the approximate straight lines between the segments is avoided. After the approximate straight lines for the segments have been obtained respectively, discontinuity in the approximate straight lines between the segments may be corrected.

Figure 10:
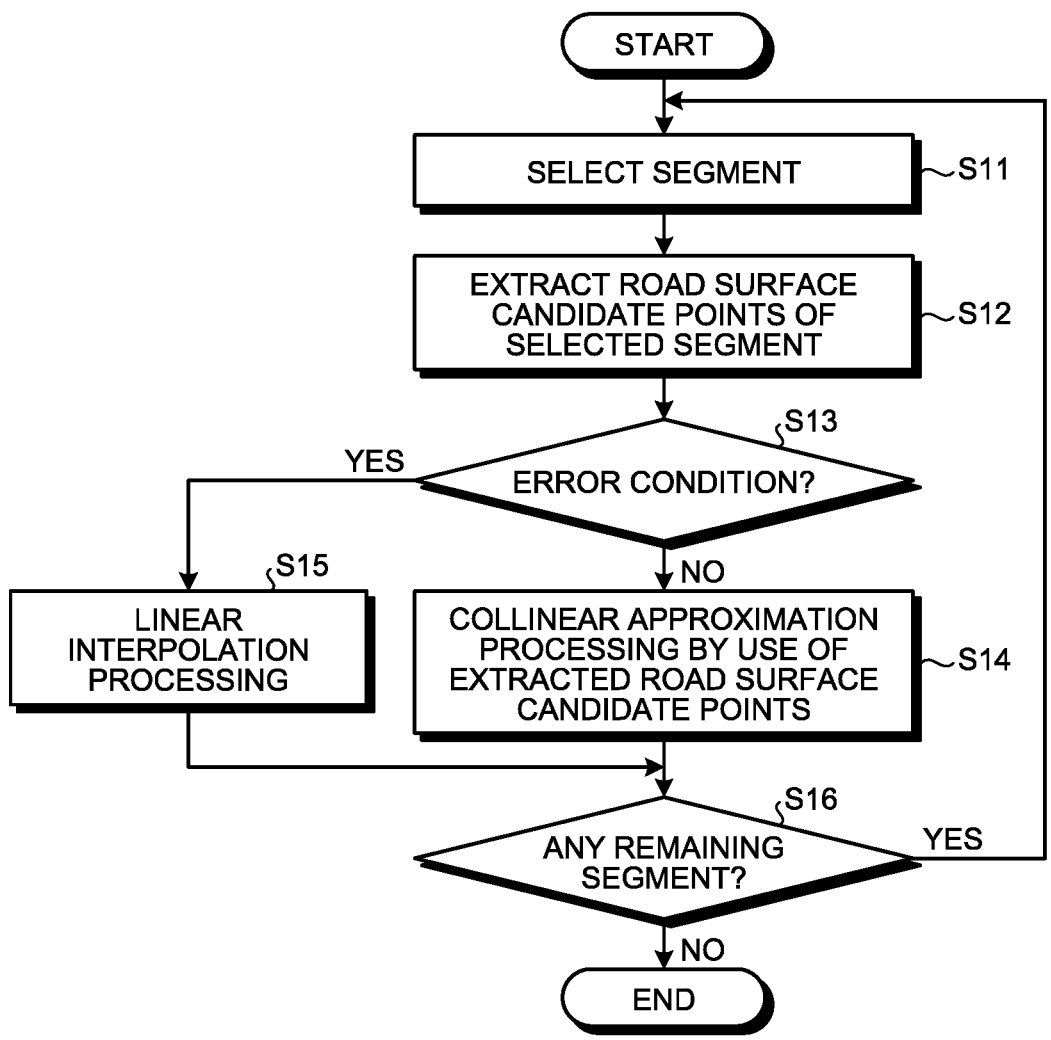
FIG. 10 is a flow chart illustrating a flow of segmented collinear approximation processing according to this embodiment.

FIG. 10 is a flow chart illustrating a flow of segmented collinear approximation processing according to this embodiment. In the segmented collinear approximation processing according to this embodiment, the first segment at the shortest distance (the segment having the largest disparity value) Sg1 is selected (S11). A road surface candidate point corresponding to each disparity value d in this first segment Sg1 is extracted (S12). Under a specific condition, like in a case where the number of road surface candidate points extracted in the first segment Sg1 is extremely small, or in a case where the extracted road surface candidate points have much error, an approximate straight line obtained by collinear approximation processing of the road surface candidate points extracted in the first segment Sg1 does not accurately reflect a three-dimensional shape of a road surface portion corresponding to the first segment Sg1. Execution of object detection processing based on such an inaccurate detection result for a three-dimensional shape of a road surface portion results in decrease of object detection accuracy.

Therefore, in this embodiment, an error condition for determination of whether the above described specific condition has been satisfied is prepared, and if the first segment Sg1 does not satisfy this error condition (No at S13), collinear approximation processing is executed by use of the road surface candidate points extracted in the first segment Sg1 (S14). In this case, since the above described specific condition has not been satisfied, an approximate straight line accurately reflecting the three-dimensional shape of the road surface portion corresponding to the first segment Sg1 is obtained.

On the contrary, if the first segment Sg1 satisfies the error condition (Yes at S13), in this embodiment, linear interpolation processing without use of the road surface candidate points extracted in the first segment Sg1 is executed (S15). The linear interpolation processing is not particularly limited, as long as the linear interpolation processing is processing, in which a straight line more appropriately representing the three-dimensional shape of the road surface portion corresponding to the first segment Sg1 is obtained without use of the road surface candidate points extracted in the first segment Sg1, than an approximate straight line obtained by collinear approximation processing of those road surface candidate points. Details of the error condition and the linear interpolation processing according to this embodiment will be described later.

When collinear approximation processing has been executed or linear interpolation processing has been executed as described above on the first segment Sg1, whether or not there is any remaining segment is checked (S16), and the above described processing of Steps S11 to S15 is executed in order from the segment at a short distance until there is no longer a remaining segment. When there is no longer a remaining segment, the segmented collinear approximation processing is ended.

When a road surface corresponding straight line formed of an approximate straight line or an interpolated straight line obtained as described above has been generated, subsequently, a road surface height table calculating unit 136 executes road surface height table calculation processing for generation of a table by calculation of road surface height (height relative to the road surface portion directly below the own vehicle 100). From information on the road surface corresponding straight line generated by the road surface shape detecting unit 135, a distance to each road surface portion depicted in each row region on the capture image (each up-down direction position in the image) is able to be calculated. In which one of row regions in the captured image each surface portion is captured is determined beforehand, the surface portion being in the traveling direction of the own vehicle and being of a virtual plane extended from the road surface portion positioned directly below the own vehicle 100 such that the virtual plane becomes parallel to the plane of that road surface portion, and this virtual plane (reference road surface) is represented by a straight line (a reference straight line) on the V-map. By comparison between the road surface corresponding straight line output from the road surface shape detecting unit 135 and the reference straight line, the height of each road surface portion in front of the own vehicle is able to be obtained. Simply, from the Y-axis position on the road surface corresponding straight line output from the road surface shape detecting unit 135, the height of a road surface portion present in front of the own vehicle by a distance found from a disparity value corresponding to this Y-axis position is able to be calculated. The road surface height table calculating unit 136 generates a table of heights of road surface portions obtained from the road surface corresponding straight line for a required disparity range.

A road surface height table obtained as described above is used in later processing in an object detection processing unit 137. In detail, a height of an object from a road surface is able to be calculated from (y'−y0), the object having been captured in a captured image portion corresponding to a point where the Y-axis position is y' at a disparity value d, when the Y-axis position on the road surface corresponding straight line at that disparity value d is y0. In general, a height H of an object from a road surface is able to be calculated by Equation (2) below, the object corresponding to coordinates (d, y') on a V-map. However, in Equation (2) below, "z" is a distance calculated from a disparity value d (z=BF/(d−offset)) and "f" is a value resulting from conversion of the focal length of the camera into units that are the same as the units of (y'−y0). Herein, "BF" is a value resulting from multiplication of the base line length of the stereo camera by the focal length, and "offset" is a disparity value upon imaging of an infinitely distant object.

$$H = z \times (y' - y0)/f \quad (2)$$

Contents of the processing in the object detection processing unit 137 are not particularly limited, as long as the object detection processing unit 137 detects an object using the obtained road surface height table.

First Error Condition

Next, an example of the error condition according to this embodiment (hereinafter, this example being referred to as "first error condition") will be described. This first error condition is a disparity value number condition that a number of road surface candidate points (a group of disparity values) extracted in the segment is equal to or less than a predetermined number. Specifically, for example, this is a condition that a road surface candidate point number ratio (N/Nmax) of the number N of road surface candidate points extracted in the segment, to the maximum number Nmax of road surface candidate points obtained in that segment, is equal to or less than 30%.

Figure 11:
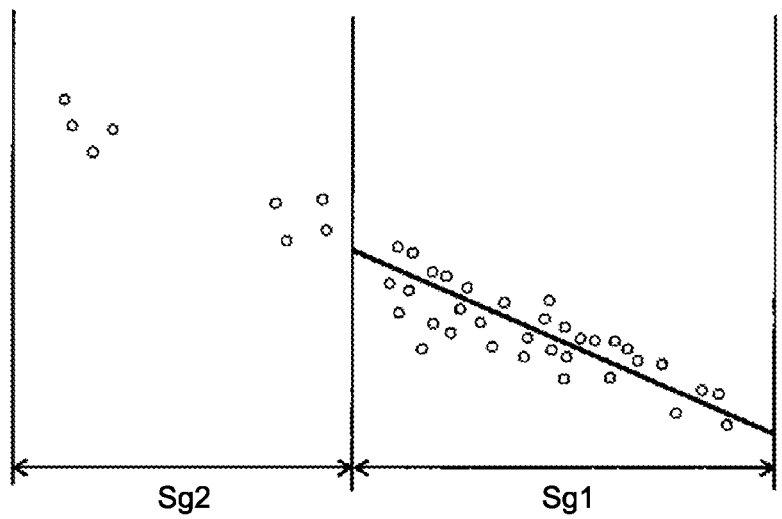
FIG. 11 is an explanatory diagram illustrating a part of a V-map for explanation of a first error condition.

FIG. 11 is an explanatory diagram illustrating a part of a V-map for explanation of this first error condition. FIG. 11 illustrates an example where the number N of road surface candidate points extracted from the second segment Sg2 is eight. Since the maximum number Nmax of road surface candidate points obtained in the second segment Sg2 is 30, the road surface candidate point number ratio N/Nmax of this second segment Sg2 is 26.67%. Therefore, the second segment Sg2 satisfies the first error condition that the road surface candidate point number ratio N/Nmax is equal to or less than 30%.

As described above, when a number of road surface candidate points (a group of disparity values) extracted is too small (when the number is equal to or less than the predetermined number), the extent, to which comparatively inaccurate road surface candidate points included in a small part of these road surface candidate points adversely influence the accuracy of an approximate straight line obtained by collinear approximation processing, is large. Therefore, an inaccurate approximate straight line is likely to be generated. According to this first error condition, use of an inaccurate approximate straight line in later object detection processing is able to be avoided, the inaccurate approximate straight line being generated as described above due to the number of road surface candidate points (a group of disparity values) extracted being too small.

Second Error Condition

Next, another example of the error condition according to this embodiment (hereinafter, this example being referred to as "second error condition") will be described. This second error condition is a condition that a number of road surface candidate points (a group of disparity values) extracted in the segment is equal to or less than the predetermined number (that is, the first error condition is satisfied), and a number of road surface candidate points (a group of disparity values) in some or every one of plural subsegments into which that segment is segmented, is equal to or less than a predetermined number.

Figure 12:
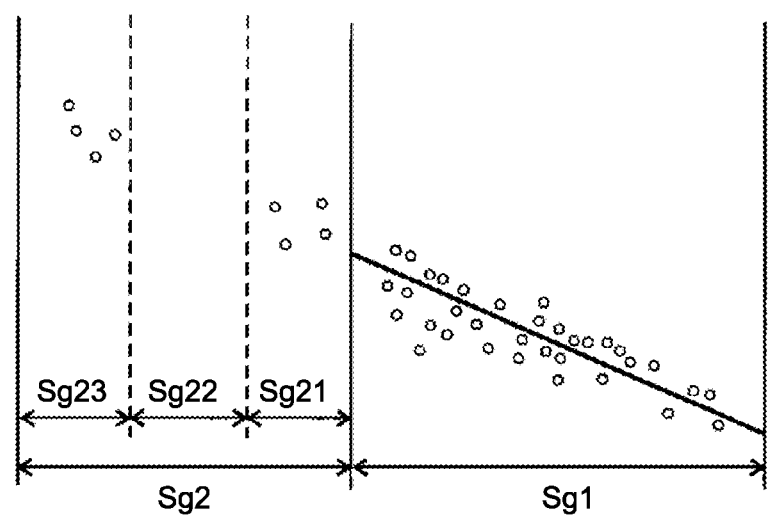
FIG. 12 is an explanatory diagram illustrating a part of a V-map for explanation of a second error condition.

FIG. 12 is an explanatory diagram illustrating a part of a V-map for explanation of this second error condition. FIG. 12 illustrates an example where the number N of road surface candidate points extracted from the second segment Sg2 is eight, and this is the same as that illustrated in FIG. 11. Therefore, the road surface candidate point number ratio N/Nmax of the second segment Sg2 is 26.67%, and the first error condition that the ratio is equal to or less than 30% is thus satisfied. However, even if the first error condition is satisfied, an accurate approximate straight line may be obtained if collinear approximation processing is executed in a narrower segment.

Therefore, according to this second error condition, if the first error condition is satisfied, three subsegments Sg21, Sg22, and Sg23 resulting from segmentation of the second segment Sg2 into three are set, and whether numbers of road surface candidate points in these subsegments are equal to or less than a predetermined number is determined. Specifically, whether a sub road surface candidate point number ratio (N'/Nmax') of: the number N' of road surface candidate points extracted from each of the three subsegments Sg21, Sg22, and Sg23; to the maximum number Nmax' of road surface candidate points obtained in that subsegment, is equal to or less than 30% is determined. The sub road surface candidate point number ratio (N'/Nmax') is not necessarily the same as the road surface candidate point number ratio (N/Nmax).

The maximum number Nmax' of road surface candidate points obtained in the first subsegment Sg21 is ten, the number N' of road surface candidate points extracted from the first subsegment Sg21 is four, and thus the sub road surface candidate point number ratio N'/Nmax' of the first subsegment Sg21 is 40%. Therefore, the first subsegment Sg21 does not satisfy the requirement that the sub road surface candidate point number ratio N'/Nmax' is equal to or less than 30%.

Similarly, the maximum number Nmax' of road surface candidate points obtained in the third subsegment Sg23 is also ten, the number N' of road surface candidate points extracted from the third subsegment Sg23 is also four, and thus the sub road surface candidate point number ratio N'/Nmax' of the third subsegment Sg23 is also 40%. Therefore, the third subsegment Sg23 does not satisfy the requirement that the sub road surface candidate point number ratio N'/Nmax' is equal to or less than 30%, either.

In contrast, the maximum number Nmax' of road surface candidate points obtained in the second subsegment Sg22 is ten, and the number N' of road surface candidate points extracted from the second subsegment Sg22 is zero. Therefore, the sub road surface candidate point number ratio N'/Nmax' of the second subsegment Sg22 is 0%, and satisfies the requirement of being equal to or less than 30%.

In this embodiment, when the requirement that the sub road surface candidate point number ratio N'/Nmax' is equal to or less than 30% is satisfied for every one of the subsegments Sg21, Sg22, and Sg23, the second error condition is satisfied. Therefore, in the example illustrated in FIG. 12, since the first subsegment Sg21 and the third subsegment Sg23 do not satisfy the requirement, the second error condition is not satisfied.

Even in a case where the number of road surface candidate points (a group of disparity values) extracted is too small (in a case where the first error condition is satisfied), if the number of road surface candidate points is a sufficient number when focused on a narrower subsegment, an accurate approximate straight line is obtained for that subsegment. According to this second error condition, even if the number of road surface candidate points extracted is too small (in the case where the first error condition is satisfied), an approximate straight line is able to be generated for a case where an accurate approximate straight line is obtainable.

Therefore, for a case where an inaccurate approximate straight line is more likely to be generated, use of that inaccurate approximate straight line in later object detection processing is able to be avoided.

Third Error Condition

Next, still another example of the error condition according to this embodiment (hereinafter, this example being referred to as "third error condition") will be described. This third error condition is a disparity value width condition that a disparity value width (an X-axis direction width on a V-map) of road surface candidate points (a group of disparity values) extracted in the segment is equal to or less than a predetermined width. Specifically, the third error condition is, for example, a condition that a disparity value width ratio (Nw/Nmax) of: the maximum number of road surface candidate points Nw between the maximum disparity value and the minimum disparity value among road surface candidate points extracted from the segment (the X-direction width between these values on the V-map); to the maximum number Nmax of road surface candidate points obtained in that segment (the X-axis direction width of the segment on the V-map), is equal to or less than 50%.

Figure 13:
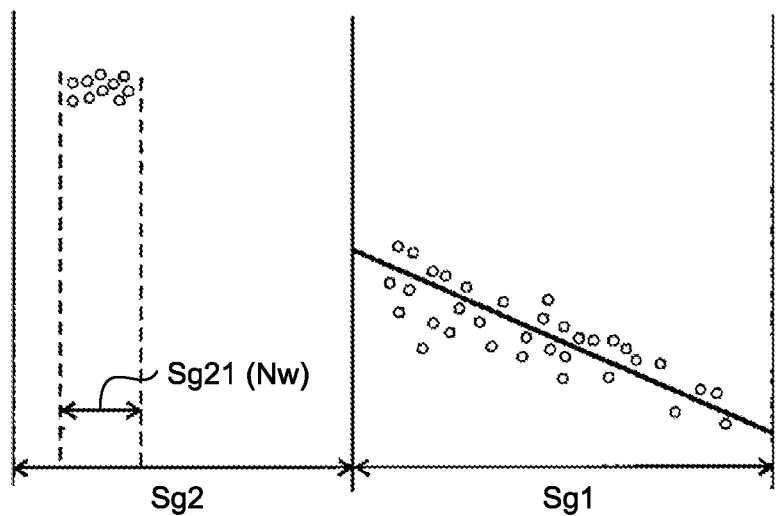
FIG. 13 is an explanatory diagram illustrating a part of a V-map for explanation of a third error condition.

FIG. 13 is an explanatory diagram illustrating a part of a V-map for explanation of this third error condition. FIG. 13 illustrates an example where the number N of road surface candidate points extracted from the second segment Sg2 is ten. Since the maximum number Nmax of road surface candidate points obtained in the second segment Sg2 is 30, the road surface candidate point number ratio N/Nmax in this second segment Sg2 is 33.33%, and thus the second segment Sg2 does not satisfy the first error condition that the road surface candidate point number ratio N/Nmax is equal to or less than 30%; and since the segment Sg21 (Nw) obtained by segmentation in Sg2 includes sufficient disparity, the requirement that the road surface candidate point number ratios N'/Nmax' of all of the segments obtained by segmentation are equal to or less than 30% is not satisfied, and thus the second error condition is not satisfied, either.

As described above, even in a case where the number of road surface candidate points (a group of disparity values) extracted exceeds the predetermined number, if the road surface candidate points concentrate at a part of the segment, the road surface candidate points are likely to not correspond to a road surface and to be those of an object other than a road surface. Therefore, when an approximate straight line is generated from such road surface candidate points, an approximate straight line appropriately representing a road surface is unable to be obtained, and an inaccurate approximate straight line is generated.

In the example illustrated in FIG. 13, the maximum number of road surface candidate points Nw between the maximum disparity value and the minimum disparity value among the road surface candidate points extracted from the second segment Sg2 is 13, and thus the disparity value width ratio (Nw/Nmax) is 43.33%, and satisfies the third error condition of being equal to or less than 50%. Therefore, the road surface candidate points extracted from the second segment Sg2 in the example illustrated in FIG. 13 are likely to correspond an object other than a road surface. According to this third error condition, use of an inaccurate approximate straight line in later object detection processing is able to be avoided, the approximate straight line being generated due to such erroneous extraction of road surface candidate points (a group of disparity values) corresponding to an object other than a road surface.

Fourth Error Condition

Next, yet another example of the error condition according to this embodiment (hereinafter, this example being referred to as "fourth error condition") will be described. This fourth error condition is an approximate straight line angle condition that a gradient angle of an approximate straight line obtained by collinear approximation of road surface candidate points (a group of disparity values) extracted from the segment is outside a predetermined angle range with respect to a gradient angle of an approximate straight line obtained by collinear approximation of road surface candidate points extracted from an adjacent segment not satisfying the error condition used in this embodiment. Specifically, the fourth error condition is, for example, a condition that a difference (an intercept difference) is equal to or greater than a prescribed value, the difference being between a Y-axis direction position (an intercept) on a V-map at a terminal end of an approximate straight line generated for the segment and a Y-axis direction position (an intercept) on the V-map where a line extended from an approximate straight line generated for another segment adjacent to that segment at a shorter distance side (a side larger in disparity value) reaches the terminal end of that segment.

Figure 14:
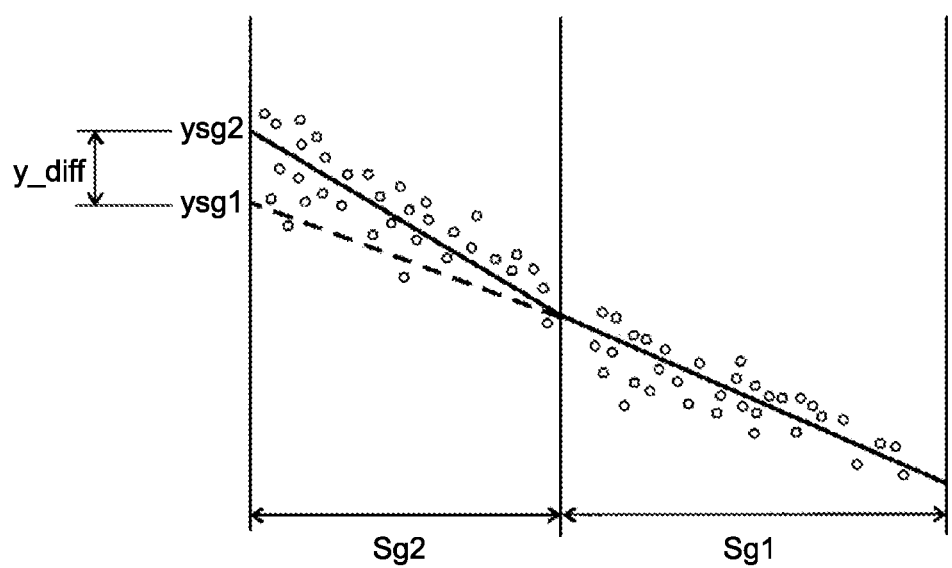
FIG. 14 is an explanatory diagram illustrating a part of a V-map for explanation of a fourth error condition.

FIG. 14 is an explanatory diagram illustrating a part of a V-map for explanation of this fourth error condition. In FIG. 14, an approximate straight line generated from road surface candidate points extracted from the second segment Sg2 has been plotted, and a terminal end position (Y-axis direction position) of the second segment Sg2 on this approximate straight line is an intercept ysg2. A Y-axis direction position where a line extended from an approximate straight line generated for the first segment Sg1 (a broken line in FIG. 14) reaches the terminal end of the second segment Sg2 is an intercept ysg1. The fourth error condition is a condition that a difference between these intercepts y_diff (=ysg2−ysg1) is equal to or greater than a prescribed value dth. In this embodiment, as described above, since the starting end of the approximate straight line generated for the second segment Sg2 coincides with the terminal end of the approximate straight line generated for the first segment Sg1, the intercept difference y_diff represents a difference between the gradient angle of the approximate straight line in the second segment Sg2 and the gradient angle of the approximate straight line in the first segment Sg1.

The intercept difference y_diff between the approximate straight line generated for the second segment Sg2 and the approximate straight line generated for the first segment Sg1 being large, that is, the gradient angle of the approximate straight line in the second segment Sg2 being outside the predetermined angle range with respect to the gradient angle of the approximate straight line in the first segment Sg1, indicates that the height or the road surface slope of a road surface portion corresponding to the second segment Sg2 has drastically changed with respect to a road surface portion corresponding to the first segment Sg1. Normally, a road surface does not drastically change in height or slope, and thus, in this case, the approximate straight line generated for the second Sg2 is likely to not appropriately correspond to a road surface and to be inaccurate. According to this fourth error condition, use of such an inaccurate approximate straight line in later object detection processing is able to be avoided.

Fifth Error Condition

Next, still another example of the error condition according to this embodiment (hereinafter, this example being referred to as "fifth error condition") will be described. This fifth error condition is an approximate straight line reliability condition that the reliability of an approximate straight line obtained by collinear approximation of road surface candidate points (a group of disparity values) extracted in the segment is lower than a predetermined threshold. Specifically, the fifth error condition is, for example, a condition that the sum, average, maximum error, or the like of errors between an approximate straight line generated for the segment and road surface candidate points extracted from the segment (Y-axis direction errors) is equal to or greater than a preset value.

Figure 15:
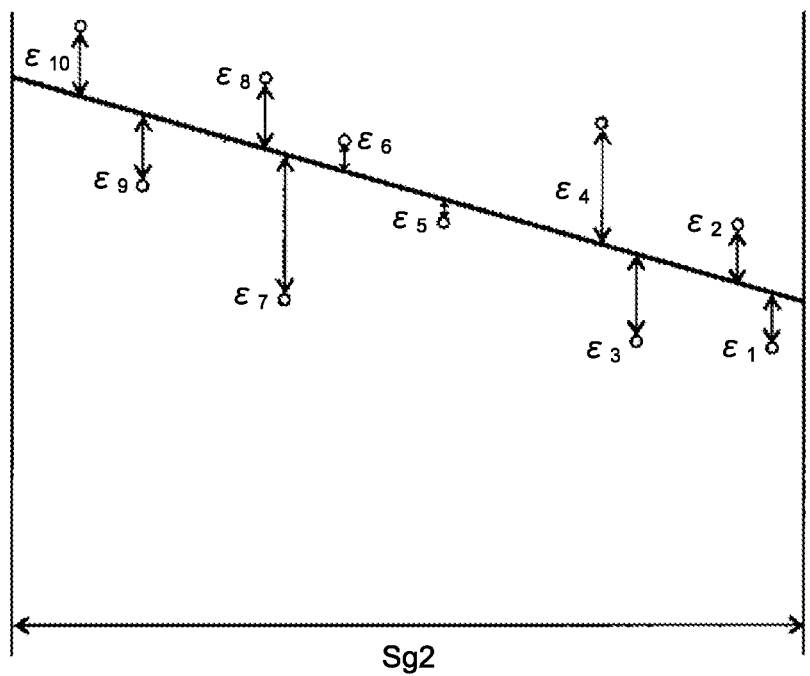
FIG. 15 is an explanatory diagram illustrating a second segment of a V-map for explanation of a fifth error condition.

FIG. 15 is an explanatory diagram illustrating a second segment of a V-map for explanation of this fifth error condition. In FIG. 15, an approximate straight line generated from road surface candidate points extracted from the second segment Sg2 has been drawn, and errors ε1 to ε10 are respectively present between the approximate straight line generated for this second segment Sg2 and the road surface candidate points extracted from the second segment Sg2. This fifth error condition is a condition that the sum of these errors ε1 to ε10 is equal to or greater than a prescribed value.

When errors between the approximate straight line generated for the second segment Sg2 and the road surface candidate points extracted from the second segment Sg2 are large, the reliability of that approximate straight line is able to be determined to be low, and thus according to this fifth error condition, use of such an unreliable (inaccurate) approximate straight line in later object detection processing is able to be avoided.

In this embodiment, linear interpolation processing is executed by determination of a segment satisfying any one of the above described first to fifth error conditions as satisfying the error condition, but error condition determination may be executed by application of at least one of the above described first to fifth error conditions.

First Linear Interpolation Processing Example

Next, an example of the linear interpolation processing according to this embodiment (hereinafter, this example being referred to as "first linear interpolation processing example") will be described. In this first linear interpolation processing example, linear interpolation processing, in which an interpolated straight line is interpolated, as an approximate straight line in a segment determined as satisfying the error condition, without use of road surface candidate points extracted this time, is executed, the interpolated straight line being generated from road surface candidate points (a group of disparity values) extracted in the past for the same segment.

Specifically, for example, an approximate straight line generated from past road surface candidate points extracted from the same segment in a captured image captured immediately before the present captured image may be obtained as an interpolated straight line. Further, for example, by use of past road surface candidate points extracted from the same segment in captured images of the last three times captured before the present captured image, an approximate straight line may be generated as an interpolated straight line from these road surface candidate points of the last three times. In the generation, weighting is preferably executed with more recent road surface candidate points being treated as having higher importance. Further, for example, the average of three approximate straight lines generated from past road surface candidate points extracted from the same segment in captured images of the last three times captured before the present captured image may be determined as an interpolated straight line. In this determination, weighting is preferably executed, with the more recent road surface candidate points being treated as having higher importance. In either case, past road surface candidate points extracted in a certain time period in the past or an approximate straight line generated in the past need/needs to be stored beforehand in a storage unit.

Normally, a part of a road surface portion corresponding to a segment determined as satisfying the error condition this time is often captured in the same segment at the time of imaging in the past. Therefore, by use of the road surface candidate points extracted in the past from the same segment as the segment determined as satisfying the error condition this time, an interpolated straight line having certain correlation with the road surface portion corresponding to the present segment is able to be obtained. Thus, such an interpolated straight line may serve as a highly accurate road surface corresponding straight line more appropriately representing a road surface corresponding to the present segment satisfying the error condition, than an approximate straight line generated from road surface candidate points extracted from that segment.

Second Linear Interpolation Processing Example Next, another example of the linear interpolation processing according to this embodiment (hereinafter, this example being referred to as "second linear interpolation processing example") will be described. In this second linear interpolation processing example, linear interpolation processing, in which an interpolated straight line is interpolated, as an approximate straight line in a segment determined as satisfying the error condition, without use of road surface candidate points extracted this time, is executed, the interpolated straight line being generated from road surface candidate points (a group of disparity values) extracted in the past for a road surface portion corresponding to that segment. In this second linear interpolation processing example also, past road surface candidate points extracted in a certain time period in the past or an approximate straight line generated in the past need/needs to be stored beforehand in a storage unit.

At which position of a past captured image a road surface portion corresponding to a segment determined as satisfying the error condition has been captured is able to be determined from vehicle velocity information or the like of the own vehicle 100. Therefore, for example, to which image portion of an immediately preceding captured image an image portion, in which a road surface portion corresponding to the present segment satisfying the error condition has been captured, corresponds, is determined from vehicle velocity information or the like; past road surface candidate points corresponding to the determined image portion are read out from the storage unit; and an approximate straight line generated from the past road surface candidate points read out is able to be determined as an interpolated straight line. Or, to which segment in an immediately preceding captured image a segment including a road surface portion corresponding to the present segment satisfying the error condition corresponds, is determined from vehicle velocity information or the like; a past approximate straight line corresponding to the determined segment is read out from the storage unit; and the past approximate straight line read out is able to be determined as an interpolated straight line.

Further, for example, to which image portion of captured images of the last three times an image portion, in which a road surface portion corresponding to the present segment satisfying the error condition has been captured corresponds, is determined from vehicle velocity information or the like; road surface candidate points of the last three times corresponding to the determined image portion are read out from the storage unit; and an approximate straight line generated from the read road surface candidate points corresponding to the last three times is able to be determined as an interpolated straight line. Or, to which segment in captured images corresponding to the last three times a segment including a road surface portion corresponding to the present segment satisfying the error condition corresponds, is determined from vehicle velocity information or the like; approximate straight lines of the last three times corresponding to the determined segment are read out from the storage unit; and the average of the read three approximate straight lines is able to be determined as an interpolated straight line. In this determination, weighting is preferably executed with the more recent road surface candidate points being treated to be higher in importance.

If the vehicle velocity of the own vehicle 100 is fast, or if the imaging intervals are long, a road surface portion corresponding to a segment determined as satisfying the error condition this time is not necessarily captured in the same segment upon imaging in the past, and may be captured in a more distant segment (a segment at a side smaller in disparity value). In this second linear interpolation processing example, since an interpolated straight line is generated by use of road surface candidate points for a road surface portion corresponding to a segment determined as satisfying the error condition this time, an accurate road surface corresponding straight line more appropriately representing a road surface corresponding to the segment than an approximate straight line generated from the road surface candidate points extracted from the present segment satisfying the error condition is able to be obtained.

Third Linear Interpolation Processing Example Next, still another example of the linear interpolation processing according to this embodiment (hereinafter, this example being referred to as "third linear interpolation processing example") will be described. In this third linear interpolation processing example, linear interpolation processing, in which a reference road surface corresponding straight line for a segment determined as satisfying the error condition is determined as an interpolated straight line for that segment without use of road surface candidate points extracted this time, the reference road surface corresponding straight line having been stored beforehand in a storage unit, and this interpolated straight line is interpolated as an approximate straight line in that segment, is executed. As this reference road surface corresponding straight line, for example, an ideal road surface corresponding straight line, which is generated when a road surface portion corresponding to the segment coincides with a relatively flat road surface, that is, the road surface portion corresponding to the segment coincides with a virtual reference road surface (a virtual reference movement surface) obtained by extension of a plane parallel to a road surface portion immediately below the own vehicle 100 to the front of the own vehicle, may be used.

Or, as the reference road surface corresponding straight line, a straight line, which is estimated by a machine learning method, such as deep learning, from a large amount of V-map information obtained by imaging in the past and approximate straight line data thereof, may be used. Specifically, for example, a road surface corresponding straight line is estimated from the present V-map information by use of various parameters determined by a machine learning method, and a portion of the estimated road surface corresponding straight line, the portion corresponding to a segment satisfying the error condition this time, is used as an interpolated straight line, and this interpolated straight line is interpolated as an approximate straight line in that segment.

In this third linear interpolation processing example also, a road surface corresponding straight line that is closer to a road surface corresponding to a segment satisfying the error condition than an approximate straight line generated from road surface candidate points extracted from the segment is able to be obtained.

In this embodiment, when it is determined that the error condition is satisfied, a road surface corresponding straight line resulting from interpolation of the segment satisfying that error condition with an interpolated straight line is generated and the road surface corresponding straight line is transmitted to the road surface height table calculating unit 136, but the embodiment is not limited to this example. For example, in a case where the error condition is determined to be satisfied, when a road surface corresponding straight line is transmitted to the road surface height table calculating unit 136, error information indicating that the segment satisfying that error condition has error may be added thereto. In this case, the road surface height table calculating unit 136 or the object detection processing unit 137 further downstream therefrom is able to perceive that the road surface corresponding straight line portion for that segment is erroneous, and thus is able to execute object detection processing without use of height information of the road surface portion corresponding to the segment. As the error information, for example, a dummy road surface corresponding straight line that would be processed as being erroneous in later processing, for example, a road surface corresponding straight line corresponding to a height exceeding 10 meters in the sky, may be used as a road surface corresponding straight line of a segment satisfying the error condition.

In the above description, the example where disparity image information generated from plural captured images acquired by use of a stereo camera is used as distance image information (disparity values are used as distance values) has been described, but the distance image information is not limited to this example. For example, distance image information generated from measured distance information acquired by another distance measuring means, such as a distance measuring radar, or distance image information obtained from disparity information and measured distance information, may be used.

What have been described above are just examples, and each of the following modes has its specific effects.

Mode A

An image processing apparatus, such as the image analyzing unit 102, which executes image processing of obtaining, based on distance image information, such as disparity image data of a region in front of a moving body in a movement direction thereof, information, such as a height of a movement surface in the region in front of the moving body in the movement direction thereof, the image processing apparatus having: a distance histogram information generating means, such as the V-map generating unit 134, which generates, based on the distance image information, distance histogram information, such as V-map information representing a frequency distribution of distance values, such as disparity values d, in each of plural row regions obtained by division of the captured image in an up-down direction; and a movement surface information processing means, such as the road surface shape detecting unit 135, which: extracts a group of distance values matching a feature represented by distance values of the movement surface, from distance values having frequencies f exceeding a predetermined frequency threshold, for each of plural segments Sg1 to Sg7 obtained by segmentation of the distance histogram information according to the distance values; executes, for a segment where a group of distance values extracted does not satisfy a predetermined error condition, processing of generating information on the movement surface using the group of distance values; and executes, for a segment where a group of distance values extracted satisfies the predetermined error condition, predetermined error processing, such as linear interpolation processing, without using the group of distance values. In this mode, whether or not the group of distance values extracted as matching the feature indicated by the distance values of the movement surface satisfies the predetermined error condition is determined for each of the segments Sg1 to Sg7 obtained by the segmentation of the distance histogram information according to the distance values. If the predetermined error condition is not satisfied, movement surface information is generated by use of the group of distance values, and thus movement surface information having the same accuracy as that of conventional movement surface information is able to be obtained. On the contrary, if the predetermined error condition is satisfied, the predetermined error processing is executed without use of the group of distance values. Therefore, by appropriate setting of the predetermined error condition, generation of movement surface information by use of the group of distance values that would generate inaccurate movement surface information and use of such movement surface information in later processing are able to be prevented.

Mode B

In the mode A, the predetermined error condition includes a distance value number condition that a number of a group of distance values extracted is equal to or less than a predetermined number. Thereby, as described above with respect to the first error condition, use of an inaccurate approximate straight line in later object detection processing is able to be avoided, the inaccurate approximate straight line being generated due to the number of the group of distance values extracted being too small.

Mode C

In the mode A, the predetermined error condition includes a condition that a number of a group of distance values extracted is equal to or less than a predetermined number, and a number of a group of distance values extracted in some or every one of plural subsegments Sg21, Sg22, and Sg23 into which that segment is further segmented, is equal to or less than a predetermined number. Thereby, as described above with respect to the second error condition, even if the number of a group of distance values extracted is too small: in a case where an accurate approximate straight line is obtainable, the approximate straight line is generated; and in a case where an inaccurate approximate straight line is more likely to be generated, use of that inaccurate approximate straight line in later object detection processing is able to be avoided.

Mode D

In any one of the modes A to C, the predetermined error condition includes a distance value width condition that a distance value width of a group of distance values extracted is equal to or less than a predetermined width. Thereby, as described above with respect to the third error condition, use of an inaccurate approximate straight line in later object detection processing is able to be avoided, the inaccurate approximate straight line being generated due to erroneous extraction of a group of distance values corresponding to an object other than the movement surface.

Mode E

In any one of the modes A to D, the predetermined error condition includes an approximate straight line angle condition that a gradient angle of an approximate straight line obtained by collinear approximation of a group of distance values extracted is outside a predetermined angle range with respect to a gradient angle of an approximate straight line obtained by collinear approximation of a group of distance values extracted from an adjacent segment not satisfying the predetermined error condition. Thereby, as described above with respect to the fourth error condition, use of an inaccurate approximate straight line in later object detection processing is able to be avoided, the inaccurate approximate straight line corresponding to a movement surface that drastically changes in height or gradient to an extent that is normally improbable.

Mode F

In any one of the modes A to E, the predetermined error condition includes an approximate straight line reliability condition that reliability of an approximate straight line obtained by collinear approximation of a group of distance values extracted is lower than a predetermined threshold. Thereby, as described above with respect to the fifth error condition, use of an unreliable and inaccurate approximate straight line in later object detection processing is able to be avoided, the unreliable and inaccurate approximate straight line being generated when the reliability of the group of disparity values extracted is low.

Mode G

In any one of the modes A to F, the predetermined error processing is processing of interpolating, as information on the movement surface in that segment, information on the movement surface generated from a group of distance values extracted in the past for the segment. Thereby, as described above with respect to the first linear interpolation processing example, an accurate road surface corresponding straight line is able to be interpolated, the accurate road surface corresponding straight line more appropriately representing the road surface corresponding to that segment than movement surface information generated from the group of distance values extracted from the segment satisfying the predetermined error condition.

Mode H

In any one of the modes A to F, the predetermined error processing is processing of interpolating, as information on the movement surface in that segment, information on the movement surface generated from a group of distance values extracted in the past for a movement surface portion corresponding to the segment. Thereby, as described above with respect to the second linear interpolation processing example, an accurate road surface corresponding straight line is able to be interpolated, the accurate road surface corresponding straight line more appropriately representing the road surface corresponding to that segment than movement surface information generated from the group of distance values extracted from the segment satisfying the predetermined error condition.

Mode I

In any one of the modes A to F, a storage means that stores therein reference information on the movement surface for each of the plural segments is included, and the predetermined error processing is processing of interpolating, as information on the movement surface in the segment, reference information on the movement surface corresponding to the segment and stored in the storage means. Thereby, as described above with respect to the third linear interpolation processing example, an accurate road surface corresponding straight line is able to be interpolated, the accurate road surface corresponding straight line more appropriately representing the road surface corresponding to the segment satisfying the predetermined error condition, than movement surface information generated from the group of distance values extracted from that segment.

Mode J

In a moving body device control system including: an image processing means that executes image processing of obtaining, based on distance image information of a region in front of a moving body in a movement direction thereof, information on a movement surface in the region in front of the moving body in the movement direction thereof; and a moving body device control means that controls, based on the information on the movement surface obtained by the image processing apparatus, a predetermined device installed in the moving body: the image processing apparatus according to any one of the modes A to I is used. Thereby, generation of movement surface information from the group of distance values that would generate inaccurate movement surface information, and use of such movement surface information in processing for control of the predetermined device, are able to be prevented, and erroneous control of the predetermined device is thus prevented.

Mode K

An image processing program that causes a computer of an image processing apparatus, which executes image processing of obtaining, based on distance image information of a region in front of a moving body in a movement direction thereof, information on a movement surface in the region in front of the moving body in the movement direction thereof, to function as: a distance histogram information generating means that generates, based on the distance image information, distance histogram information representing a frequency distribution of distance values in each of plural row regions obtained by division of the captured image in an up-down direction; and a movement surface information processing means that: extracts a group of distance values matching a feature represented by distance values of the movement surface, from distance values having frequencies exceeding a predetermined frequency threshold, for each of plural segments obtained by segmentation of the distance histogram information according to the distance values; executes, for a segment where a group of distance values extracted does not satisfy a predetermined error condition, processing of generating information on the movement surface using the group of distance values; and executes, for a segment where a group of distance values extracted satisfies the predetermined error condition, predetermined error processing without using the group of distance values. Thereby, generation of movement surface information by use of the group of distance values that would generate inaccurate movement surface information, and use of such movement surface information in later processing, are able to be prevented. This program may be distributed or obtained in a state of being recorded in a recording medium, such as a CD-ROM. Further, the program may be distributed or obtained by distribution or reception of a signal carrying this program and transmitted by a predetermined transmission device, via a transmission medium, such as a public telephone line, an exclusive line, or any of other communication networks. In this distribution, at least a part of the computer program may be transmitted in the transmission medium. That is, not all of data forming the computer program need to be present in the transmission medium at once. The signal carrying this program is a computer data signal realized as a predetermined carrier wave including the computer program. Further, transmission methods for transmission of the computer program from the predetermined transmission device include continuous transmission and intermittent transmission of data forming the program.

Mode L

In an image processing method of obtaining, based on distance image information of a region in front of a moving body in a movement direction thereof, information on a movement surface in the region in front of the moving body in the movement direction thereof: based on the distance image information, distance histogram information representing a frequency distribution of distance values in each of plural row regions obtained by division of the captured image in an up-down direction is generated; a group of distance values matching a feature represented by distance values of the movement surface is extracted from distance values having frequencies exceeding a predetermined frequency threshold, for each of plural segments obtained by segmentation of the generated distance histogram information according to the distance values; for a segment where a group of distance values extracted does not satisfy a predetermined error condition, processing of generating information on the movement surface by use of the group of distance values is executed; and for a segment where a group of distance values extracted satisfies the predetermined error condition, predetermined error processing is executed without use of the group of distance values. Thereby, generation of movement surface information by use of the group of distance values that would generate inaccurate movement surface information, and use of such movement surface information in later processing, are able to be prevented.

An embodiment has an excellent effect of enabling prevention of use of inaccurate movement surface information in later processing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

100 OWN VEHICLE
101 IMAGING UNIT
102 IMAGE ANALYZING UNIT
103 DISPLAY MONITOR
106 VEHICLE TRAVEL CONTROL UNIT
110A, 110B IMAGING SECTION
131 PARALLELIZED IMAGE GENERATING UNIT
132 DISPARITY IMAGE GENERATING UNIT
133 DISPARITY INTERPOLATION UNIT
134 V-MAP GENERATING UNIT
135 ROAD SURFACE SHAPE DETECTING UNIT
136 ROAD SURFACE HEIGHT TABLE CALCULATING UNIT
137 OBJECT DETECTION PROCESSING UNIT

What is claimed is:

1. An image processing apparatus configured to execute image processing of obtaining, based on distance image information in front of a moving body in a movement direction, information on a movement surface in front of the moving body in the movement direction, the image processing apparatus comprising:

processing circuitry configured to:
  generate, based on the distance image information, distance histogram information representing a frequency distribution of distance values in each row region of a plurality of row regions obtained by division of a captured image in an up-down direction;
  extract a group of distance values matching a feature represented by distance values of the movement surface, from distance values having frequencies exceeding a predetermined frequency threshold, for each segment of a plurality of segments obtained by segmentation of the distance histogram information according to the distance values;
  execute, for a segment in a case that the group of distance values does not satisfy a predetermined error condition, processing of generating information on the movement surface using the group of distance values; and
  execute, for the segment in a case that the group of distance values satisfies the predetermined error condition, predetermined error processing without using the group of distance values, wherein the predetermined error condition includes an approximate straight line angle condition that a gradient angle of an approximate straight line obtained by collinear approximation of the group of distance values is outside a predetermined angle range with respect to a gradient angle of an approximate straight line obtained by collinear approximation of the group of distance values from an adjacent segment not satisfying the predetermined error condition.

2. The image processing apparatus according to claim 1, wherein the predetermined error condition further includes a distance value number condition that a number of the group of distance values is equal to or less than a predetermined number.

3. The image processing apparatus according to claim 1, wherein the predetermined error condition further includes a condition that a number of the group of distance values is equal to or less than a predetermined number in some or every one of a plurality of sub-segments into which a segment satisfying a condition that the number of the group of distance values is equal to or less than a predetermined number, is further segmented.

4. The image processing apparatus according to claim 1, wherein the predetermined error condition further includes a distance value width condition that a distance value width of the group of distance values is equal to or less than a predetermined width.

5. The image processing apparatus according to claim 1, wherein the predetermined error condition further includes an approximate straight line reliability condition that a reliability of an approximate straight line obtained by collinear approximation of the group of distance values is lower than a predetermined threshold.

6. The image processing apparatus according to claim 1, wherein the predetermined error processing is processing of interpolating information on the movement surface generated from the group of distance values for a segment satisfying the predetermined error condition, as information on the movement surface in that segment.

7. The image processing apparatus according to claim 1, wherein the predetermined error processing is processing of interpolating information on the movement surface generated from the group of distance values for a movement surface portion corresponding to a segment satisfying the predetermined error condition, as information on the movement surface in that segment.

8. The image processing apparatus according to claim 1, further comprising:
a memory configured to store reference information of the movement surface for each of the plurality of segments, wherein
the predetermined error processing is processing of interpolating reference information on the movement surface in a segment satisfying the predetermined error condition, and
the reference information is stored in the memory as information on the movement surface corresponding to that segment.

9. A moving body device control system, comprising:
the image processing apparatus according to claim 1, wherein the processing circuitry is further configured to execute image processing of obtaining, based on the distance image information in front of the moving body in the movement direction, the information on the movement surface in front of the moving body in the movement direction; and
a moving body device control circuit configured to control, based on the information on the movement surface, a predetermined device installed in the moving body.

10. An non-transitory computer-readable medium including programmed instructions that cause a computer of an image processing apparatus configured to execute image processing of obtaining, based on distance image information in front of a moving body in a movement direction, information on a movement surface in front of the moving body in the movement direction, to:
generate, based on the distance image information, distance histogram information representing a frequency distribution of distance values in each row region of a plurality of row regions obtained by division of a captured image in an up-down direction;
extract a group of distance values matching a feature represented by distance values of the movement surface, from distance values having frequencies exceeding a predetermined frequency threshold, for each segment of a plurality of segments obtained by segmentation of the distance histogram information according to the distance values;
execute, for a segment in a case that the group of distance values does not satisfy a predetermined error condition, processing of generating information on the movement surface using the group of distance values; and
execute, for the segment in a case that the group of distance values satisfies the predetermined error condition, predetermined error processing without using the group of distance values, wherein
the predetermined error condition includes an approximate straight line angle condition that a gradient angle of an approximate straight line obtained by collinear approximation of the group of distance values is outside a predetermined angle range with respect to a gradient angle of an approximate straight line obtained by collinear approximation of the group of distance values from an adjacent segment not satisfying the predetermined error condition.

11. An image processing method for obtaining, based on distance image information in front of a moving body in a movement direction, information on a movement surface in front of the moving body in the movement direction, the method comprising:
generating, based on the distance image information, distance histogram information representing a frequency distribution of distance values in each row region of a plurality of row regions obtained by division of a captured image in an up-down direction;
extracting a group of distance values matching a feature represented by distance values of the movement surface, from distance values having frequencies exceeding a predetermined frequency threshold, for each segment of a plurality of segments obtained by segmentation of the generated distance histogram information according to the distance values;
executing, for a segment in a case that the group of distance values does not satisfy a predetermined error condition, processing of generating information on the movement surface by use of the group of distance values; and
executing, for the segment in a case that the group of distance values satisfies the predetermined error condition, predetermined error processing is executed without use of the group of distance values, wherein the predetermined error condition includes an approximate straight line angle condition that a gradient angle of an approximate straight line obtained by collinear approximation of the group of distance values is outside a predetermined angle range with respect to a gradient angle of an approximate straight line obtained by collinear approximation of the group of distance values from an adjacent segment not satisfying the predetermined error condition.

* * * * *